United States Patent
Calcagno et al.

[15] 3,691,098
[45] Sept. 12, 1972

[54] PROCESS FOR MANUFACTURING OXYCHLORINATION CATALYSTS

[72] Inventors: Benedetto Calcagno, Milan; Marcello Ghirga, Bresso; Natale Bertolini, Milan, all of Italy

[73] Assignee: Societa Italianca Resini S.P.A., Milan, Italy

[22] Filed: Oct. 29, 1970

[21] Appl. No.: 85,309

[30] Foreign Application Priority Data

Nov. 14, 1969 Italy......................24409 A/69

[52] U.S. Cl. ..................252/441, 252/442, 252/454, 252/476, 260/659 A
[51] Int. Cl. ..............................................B01j 11/78
[58] Field of Search....252/454, 441, 476; 260/459 A

[56] References Cited
UNITED STATES PATENTS

| | | | |
|---|---|---|---|
| 3,232,889 | 2/1966 | Bellis | 252/441 |
| 2,289,784 | 7/1942 | Houghton | 252/476 |
| 2,847,475 | 8/1958 | Voge et al. | 252/476 |
| 3,210,431 | 10/1965 | Engel | 260/659 A |
| 3,461,084 | 8/1969 | Ping Li | 252/441 |

*Primary Examiner*—C. F. Dees
*Attorney*—Sughrue, Rothwell, Mion, Zinn & Macpeak

[57] ABSTRACT

Oxychlorination catalysts for conversion of hydrocarbons or partially chlorinated hydrocarbons to chlorinated derivatives are made by fluidizing a bed of decomposable copper salt and an inert support, optionally in the presence of an alkali metal chloride, by means of a flow of hydrochloric acid gas and a molecular-oxygen containing gas.

12 Claims, No Drawings

PROCESS FOR MANUFACTURING OXYCHLORINATION CATALYSTS

The invention relates to catalysts for oxychlorination and for a process for obtaining them.

Oxychlorination is understood as being the reaction by which chlorinated hydrocarbons are obtained from gaseous mixtures consisting of hydrocarbons or partially chlorinated hydrocarbons, oxygen or gases containing molecular oxygen, and hydrochloric acid gas, by contact with catalysts consisting of salts, and particularly halides, of metals of variable valency.

Particularly useful as a catalytic salt is cupric chloride, normally in combination with other salts such as for example the chlorides of alkali metals or rare earths.

Such salts are used in a form supported on solid and inert materials. In industrial practice, hydrochloric acid gas, the oxidizing gas and the organic substance are supplied to the catalytic bed in fixed or fluidized form.

Normally used as support materials for the catalytic salts are silica, alumina or the substances known as decolorizing earths.

According to the prior art, the preparation of the supported catalyst consists in impregnating the particles of the support material with an aqueous solution of catalytic salts and subsequently drying the impregnated particles.

It is also possible to impregnate the support hot so as to produce drying of the particles at the same time.

According to another known process, the particles of the support material are maintained in fluidized form by a hot gas, normally air, while an aqueous solution of the catalytic salts is sprayed over the particles.

Such methods of preparation offer the disadvantages inherent in the use of saline aqueous solutions with the inevitable problems of corrosion. Furthermore, catalysts which are thus prepared have various undesirable properties in their use in oxychlorination.

Thus, for example, it is possible for important quantities of products of combustion of the hydrocarbon to form, and also products of reaction may result that have a degree of chlorination which is other than that desired. Furthermore, high percentages of unchanged products are often obtained. In this way, the process is burdened by the need for troublesome processes to recover and purify the products of reaction.

It has now been found that the aforesaid drawbacks may be substantially reduced and in some cases even eliminated by means of particular catalysts, giving high rates of conversion and high selectivity.

The process for the manufacture of catalysts for oxychlorination according to the present invention consists in bringing a gaseous mixture comprising molecular oxygen and hydrochloric acid gas into contact with a mixture of solid particles of the inert support and of a copper salt, the said salt being chosen from among those which decompose under the conditions of operation.

In the event of an alkali metal being desired to be present, it is added in the form of a chloride while the catalyst is being prepared.

More precisely according to the method of the present invention, the hydrochloric acid and the oxygen or the gas containing molecular oxygen are supplied to the base of a fluidized bed of solid particles, the said particles comprising the inert and granular support, the decomposable copper salt such as for example copper oxalate, formate or lactate and optionally, an alkali metal in the form of chloride.

The catalyst is preferably prepared at elevated temperatures, normally of 250° to 550° C, the ratio by volume of hydrochloric acid:oxygen in the gas supplied being between 0.1:1 and 10:1.

The quantity of catalytic salts used will be such as to produce in the finished catalyst a copper content of 5 to 20 percent by weight when calculated as a metal. The quantity of alkali metal, which is preferably lithium or potassium, is preferably 10 percent or less by weight in the finished catalyst.

The times required for manufacturing the catalyst will depend essentially on the need to have a virtually complete conversion of the catalytic salts to chlorides. Thus, working under the conditions previously described, reaction times in excess of an hour will be used. Ordinarily it is not desirable to work for times in excess of 24 hours. As supports for the catalyst, silica, alumina or preferably the substances known as decolorizing earths may be used, for example diatomaceous earths, Fuller's earths or kieselguhr, preferably in the form of particles of about 20 to 100 mesh. Such support materials and catalytic salts are placed in an appropriate reactor, normally of elongated tubular form, at the base of which the gaseous mixture is supplied at a velocity such as to produce fluidization of the solid particles, the working pressures ranging from ambient pressure up to a few atmospheres.

The catalysts thus obtained are highly active and selective.

Suitable hydrocarbons for subjection to the process of oxychlorination are for example aliphatic hydrocarbons containing from one to four carbon atoms in the molecule, such as ethylene, ethane, methane and propane or their partially chlorinated derivatives.

The chlorinating agent is constituted by hydrochloric acid, while the oxidizing gas used may be oxygen or a gas containing molecular oxygen, such as for example air.

In such reactions, the temperatures are normally between 230° and 500° C while the pressures range from ambient pressure up to a few atmospheres.

Furthermore, the velocity of the reactive gases is maintained at values such as to produce fluidization of the catalytic particles, with contact times generally between 1 and 20 seconds.

In particular, the catalysts of the present invention are useful in the process for manufacturing dichloroethane from ethylene.

In this case, the reactive mixture is supplied at the base of a reactor, a molar ratio of ethylene:oxygen of 1:1.7 to 1:2.3 preferably being maintained, preferably along with a molar ratio of hydrochloric acid:oxygen of 3:1 to 4:1.

Furthermore, the working temperatures preferably range from 280° to 320° C and the working pressures from ambient pressure up to a few atmospheres.

By working under these conditions with a catalyst supported on decolorizing earths, it has been found possible, in contrast with known processes, to achieve higher rates of reagent conversion while at the same time maintaining high values of selectivity.

Finally, it has been found that the catalysts of the present invention are useful in the production of chlorine by catalytic oxidation with oxygen or gases containing molecular oxygen of hydrochloric acid.

The following examples illustrate the invention.

EXAMPLE 1

One-hundred g Florex LVM with a granular range of 30 to 60 mesh (calcined Fuller's earth by the Floridin Company) are mixed dry with 30 g copper oxalate and 12 g potassium chloride.

The mixture is maintained under fluidized conditions for 12 hours, 30 liters per hour of hydrochloric acid and 90 liters per hour of air being supplied and the working temperature being approx. 470° C. Finally, the catalyst is cooled and discharged.

EXAMPLE 2 (Use of catalyst)

One-hundred ml of the catalyst prepared as described in the first example (approx. 65 g) are placed in a glass reactor with an inside diameter of 24 mm and a length of 50 cm. Heating is achieved by an electrical resistance wound inside a double glass jacket which encloses the reactor.

Hydrochloric acid, ethylene and oxygen in a molar ratio of 2.05:1.07:0.6 and at a velocity of about 15.7 cm/sec are fed in at the bottom of the reactor through a blending system.

In this way, the time for which the reagents are in contact with the fluid catalyst is about 1.9 seconds.

The ethylene is subjected to oxychlorination at 305° C, no overpressure being applied to the reactor.

The dichloroethane and the hydrochloric acid are recovered from the gaseous products emerging from the reactor by cooling and by precipitation, using dilute soda.

The conversion of reagents is calculated on a basis of the weight balance subject to analysis by titration or by gas chromatography. Working under the conditions described, a conversion of the hydrochloric acid of 96 percent was achieved, conversion of the ethylene being 99 percent and of the oxygen 80 percent.

From the crude liquid produced, a dichloroethane of purity equal to 99.3 percent was recovered.

EXAMPLE 3

One-hundred g Florex LVM with a granular range of 30 to 60 mesh are maintained fluid by a flow of air. While a temperature equal to approx. 120° C is maintained, the support is impregnated with 200 ml of an aqueous solution containing 27 g dehydrated cupric chloride dihydrate and 14 g potassium chloride.

Finally, the catalyst is cooled and discharged.

EXAMPLE 4 (Use of the catalyst)

Oxychlorination of ethylene is carried out exactly as described in Example 2, the only difference being in the use of the catalyst obtained as described in Example 3.

In this way, it was possible to achieve 90 percent conversion of the hydrochloric acid, 82 percent conversion of the ethylene and 80 percent conversion of the oxygen.

Furthermore, the dichloroethane in the crude liquid product of reaction had a titre of 98.2 percent.

We claim:

1. A process for manufacturing catalysts for oxychlorination comprising:

mixing an inert and subdivided solid support with a decomposable copper salt;

fluidizing said solid mixture at a temperature from 250° C to 550° C, and at a pressure of at least ambient pressure for a reaction period ranging from 1 to 24 hours with a gaseous flow comprising gaseous hydrochloric acid and molecular oxygen; and cooling the mass and recovering the catalyst thus obtained.

2. A process as claimed in claim 1, wherein the support is selected from silica, alumina, and decolorizing earths, in the form of particles of 20 to 100 mesh.

3. A process as claimed in claim 1, wherein the decomposable copper salt is selected from the salts of oxalic acid, formic acid or lactic acid.

4. A process as claimed in claim 1, wherein the ratio by volume of hydrochloric acid to oxygen in said gaseous flow is from 0.1 to 1 to 10 to 1.

5. A process as claimed in claim 1, wherein the copper salt is used in such a quantity as to produce in the finished catalyst a content of 5 to 20 percent by weight of metallic copper.

6. A process as claimed in claim 1, wherein a chloride of an alkali metal is mixed with said solid support and said decomposable copper salt.

7. A process as claimed in claim 6, wherein the support is selected from silica, alumina and decolorizing earths, in the form of particles of 20 to 100 mesh.

8. A process as claimed in claim 6, wherein the decomposable copper salt is selected from the salts of oxalic acid, formic acid or lactic acid, and wherein the alkali metal chloride is lithium or potassium chloride.

9. A process as claimed in claim 6, wherein the ratio by volume of hydrochloric acid to oxygen in said gaseous flow is from 0.1 to 1 to 10 to 1.

10. A process as claimed in claim 6, wherein the copper salt is used in such a quantity as to produce in the finished catalyst a content of 5 to 20 percent by weight of metallic copper, and wherein the quantity of alkali metal is maintained at a value of 10 percent or less by weight based on the finished catalyst.

11. A process as claimed in claim 1, wherein said salt is virtually completely converted to the chloride form.

12. A process as claimed in claim 1, wherein said gaseous flow consists essentially of gaseous hydrochloric acid and molecular oxygen.

* * * * *